(No Model.)

H. B. BRECKWEDEL.
BICYCLE BELL.

No. 558,347. Patented Apr. 14, 1896.

WITNESSES:
Paul Johst
J. B. Caplinger

INVENTOR
H. B. Breckwedel
BY
Munn & Co
ATTORNEYS.

UNITED STATES PATENT OFFICE.

HARRY B. BRECKWEDEL, OF NEW YORK, N. Y.

BICYCLE-BELL.

SPECIFICATION forming part of Letters Patent No. 558,347, dated April 14, 1896.

Application filed July 5, 1895. Serial No. 555,019. (No model.)

*To all whom it may concern:*

Be it known that I, HARRY B. BRECKWEDEL, of New York city, in the county and State of New York, have invented a new and Improved Bell for Bicycles and the Like, of which the following is a full, clear, and exact description.

This invention relates to certain improvements in bells—such, for example, as are used as alarms on vehicles, as bicycles, cars, &c., to give warning of their approach to pedestrians; and the object of the invention is to provide a bell of this character of a simple and inexpensive construction which shall be better adapted for use than similar devices heretofore employed.

The invention contemplates certain novel features of construction and combinations and arrangements of the various parts of the device, whereby certain important advantages are attained and the device is made simpler and better adapted for use than other forms of bell heretofore in use, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1:
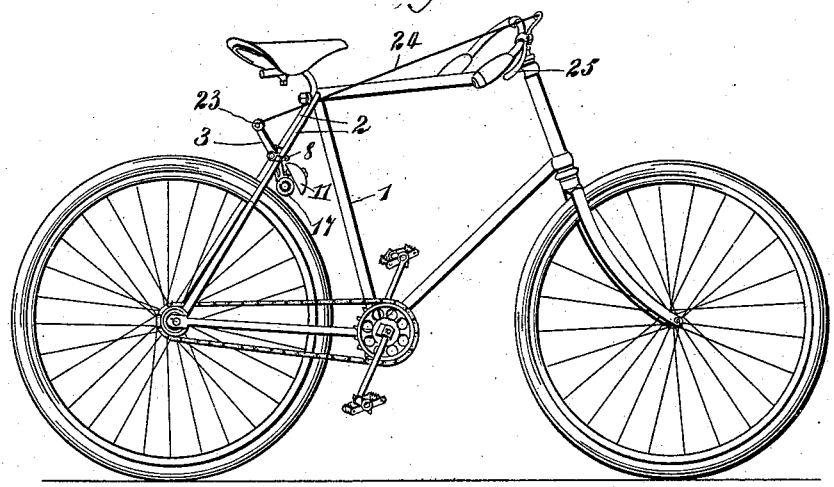
Figure 2:
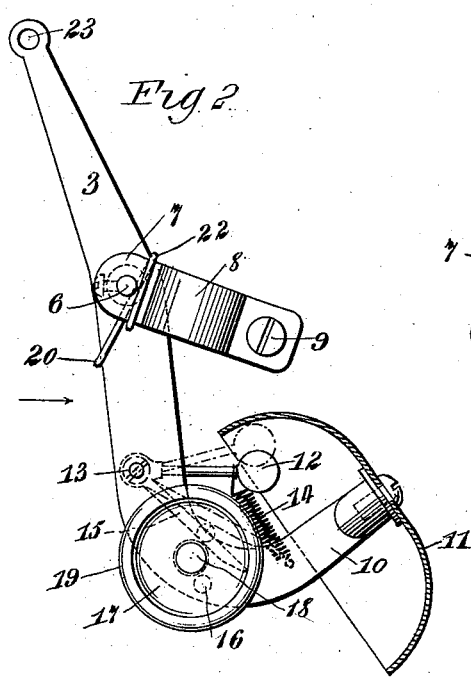
Figure 3:
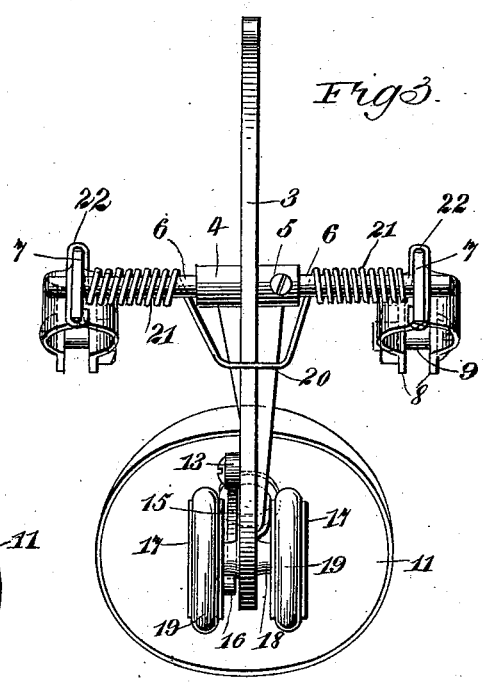

Figure 1 is a general view drawn to a small scale and showing my improved bell arranged in position for use on a bicycle or the like. Fig. 2 is a side view of the device drawn to an enlarged scale and detached, the bell itself being shown in section; and Fig. 3 is a rear view of the bell in the position in which it stands when in use on a bicycle.

In the views, 1 represents the frame of the vehicle to which the bell is applied for use, herein shown as a bicycle, having rear forks 2, arranged at opposite sides of the rear wheel, which is journaled between their extremities in the usual way.

3 represents the swinging bell-frame, having a central sleeve 4 secured to or formed integrally with it and adapted to be secured by means of a set-screw 5, extending through said sleeve at the center of a shaft or spindle 6, the ends of which extend in opposite directions from the said bell-frame 3 and are loosely mounted in apertured lugs 7, formed on clips 8, adapted to be set fast by means of bolts or screws 9 to the forks 2 of the frame of the vehicle, as seen in Fig. 1.

The bell-frame 3 is formed with a bent end 10, as clearly seen in Fig. 2, and at the extremity of said bent end 10 is secured the bell 11, which may be of any preferred kind, secured in any manner. As herein shown the bell is in the ordinary gong form, secured in place by means of a screw, and is adapted to be struck and sounded by a hammer 12, pivoted at 13 to the bell-frame 3 and provided with a spring 14, serving to hold said hammer normally out of operative position.

The hammer 12 is provided with an arm or projection 15, adapted to be engaged by a pin or stud 16, secured on and projecting from a wheel 17, mounted on one end of a shaft 18, rotatively mounted in the bent end 10 of the bell-frame, the other end of said shaft 18 being arranged to project on the opposite side of the bell-frame and being also provided with a wheel 17, secured to it, as clearly seen in Fig. 3.

The wheels 17 on opposite ends of the rotative shaft 18 are provided with elastic frictional tires or treads 19, of rubber or equivalent material, and are arranged when the bell-frame 3 is swung pivotally, as will be presently described, to engage the tire of the vehicle-wheel, so that the movement thereof will be communicated to said wheels 17 to sound the bell 11; and in order to hold said bell-frame 3 in an elevated position, so that the wheels 17 shall not contact with the tire of the vehicle-wheel, I employ a spring 20, the central portion of which is bent to form a loop, so as to bear under the bell-frame 3, and the end portions of which are bent to form coils 21, embracing the opposite ends of the shaft or spindle 6, and are provided at their extremities with hooks 22, engaging the lugs 7 of the clips 8, so as to prevent the lateral movement of the bell-frame when once secured in place.

The upper end of the bell-frame 3 is provided with a perforation 23, adapted to receive the end of a cord or wire 24, which is carried forward along the vehicle-frame 1 and connected to one end of a lever 25, pivoted on the steering-head, and having its free end arranged in position to be conveniently engaged by the hand of the user to ring the bell.

In operation when it is desired to ring the bell the rider presses on the handle of the lever 25, so as to swing the bell-frame 3, thereby placing the springs under tension and moving the wheels or rollers 17 into frictional engagement with the wheel-tire, so that said rollers or wheels 17 are set into rotative movement. At each rotation of said wheels 17 the pin 16 comes into engagement with the arm or projection 15 of the hammer 12 and moves the same so as to sound the bell, the spring 14 serving to return said hammer after each movement.

As the rollers or wheels 17 are of small diameter, it is obvious they will be set in very rapid rotative movement, so that a quick succession of taps is produced on the bell each time the lever 25 is actuated. When the said lever is again released, the spring formed of the central portion 20 and end portions 21 and 22 at once acts to return the bell-frame to its raised position.

The construction of the device as above set forth is very simple and inexpensive and affords a very convenient alarm for all kinds of vehicles whereon bells are usually provided, since to operate it it is only necessary to press the lever 25 and hold it depressed, whereupon the bell will be sounded until the lever is released.

The bell as herein shown and described is especially adapted for use as an alarm for bicycles; but it is obvious that with some slight changes in the structure and form of the parts it may be also adapted for use on other vehicles, such as motor and cable cars and the like, and for this reason I do not wish to be understood as limiting myself to the precise form of the device as herein set forth.

The peculiar means employed for holding the clips 8, which are loosely mounted on the shaft 6, against removal from said shaft, said means consisting of the spring having its end portions 21 coiled around said shaft and its extremities 22 formed into hooks which engage said clips, permits said clips to be adjusted toward or from one another to accommodate the device to the forks of different wheels and to different positions on the forks.

Having thus described my invention, I claim as new and desire to secure by Letters Patent—

1. A bell for bicycles and the like, comprising a frame having a shaft projecting from opposite sides, clips in which the ends of the shaft are mounted and by which the frame is secured in position, a spring on the shaft and engaging the frame, a bell carried by the frame, a spring-pressed bell-hammer carried by the frame, a roller mounted in the said frame, and means for operating the bell-hammer from the roller, substantially as described.

2. A bell for bicycles and the like, comprising a frame having a shaft projecting from opposite sides, clips in which the ends of the shaft are mounted and by which the frame is secured in position, a spring on the shaft and engaging the frame, a bell carried by the frame, a pivoted and spring-pressed bell-hammer provided with an arm, and a roller mounted in the frame and provided with a pin engaging the arm of the bell-hammer, substantially as described.

3. In a bell for bicycles and the like, a frame having a shaft projecting from opposite sides, clips for securing the frame in position and provided with apertured lugs receiving the ends of the shaft, and a spring having its ends coiled around the shaft and engaging the lugs of the clips, the central portion of the spring engaging the frame, in combination with a bell on the frame, a bell-hammer, and a roller mounted in the frame and operating the bell-hammer, substantially as described.

4. The combination of a bell-frame having a shaft projecting from its opposite sides, clips having lugs loosely engaging said shaft, a spring having a central portion engaging the frame and having its end portions coiled on said shaft on opposite sides of the frame, the extremities of said spring being provided with hooks engaging said lugs on the clips, a bell on said frame, a hammer for said bell, a roller on the frame adapted to contact with the wheel-tire, and means actuated from said roller for operating the said hammer, substantially as set forth.

5. The combination of a bell-frame having a shaft projecting from its opposite sides, a bell on the said frame, a hammer for said bell, a roller on the frame arranged to contact with the bicycle-wheel, means actuated from said roller to operate the hammer, clips slidable on the ends of said shaft on opposite sides of the bell-frame and adapted to be clamped to the forks of the bicycle-frame, and means for holding said clips in position while permitting longitudinal and rotatable movement of said shaft through them, substantially as described.

HARRY B. BRECKWEDEL.

Witnesses:
J. D. CAPLINGER,
C. SEDGWICK.